United States Patent
Zhu (10) Patent No.: US 9,497,426 B2
(45) Date of Patent: Nov. 15, 2016

(54) METHOD FOR QUICK PHOTOGRAPHING BASED ON MOBILE APPARATUS, DEVICE FOR QUICK PHOTOGRAPHING BASED ON MOBILE APPARATUS AND MOBILE APPARATUS

(71) Applicant: Smartisan Technology Co., Ltd., Beijing (CN)

(72) Inventor: Xiaomu Zhu, Beijing (CN)

(73) Assignee: SMARTISAN DIGITAL CO., LTD, Beijing (CN)

( * ) Notice: Subject to any disclaimer, the term of this patent is extended or adjusted under 35 U.S.C. 154(b) by 46 days.

(21) Appl. No.: 14/601,687

(22) Filed: Jan. 21, 2015

(65) Prior Publication Data

US 2016/0212387 A1    Jul. 21, 2016

(51) Int. Cl.
*H04N 7/18*     (2006.01)
*H04N 5/225*    (2006.01)
*H04N 7/14*     (2006.01)

(52) U.S. Cl.
CPC .............. *H04N 7/185* (2013.01); *H04N 5/225* (2013.01); *H04N 2007/145* (2013.01)

(58) Field of Classification Search
CPC . H04N 7/185; H04N 5/225; H04N 2007/145
See application file for complete search history.

(56) References Cited

U.S. PATENT DOCUMENTS

| | | | | |
|---|---|---|---|---|
| 2002/0196357 | A1* | 12/2002 | Battles | H04N 1/0044 348/333.01 |
| 2008/0132199 | A1* | 6/2008 | Hirata | G08B 25/016 455/404.2 |
| 2010/0151903 | A1* | 6/2010 | Yamamoto | H04N 5/235 348/229.1 |
| 2012/0019704 | A1* | 1/2012 | Levey | H04N 5/23241 348/335 |

FOREIGN PATENT DOCUMENTS

| | | |
|---|---|---|
| CN | 103019542 A | 4/2013 |
| CN | 103312876 A | 9/2013 |
| CN | 103327160 A | 9/2013 |

* cited by examiner

*Primary Examiner* — Gevell Selby
(74) *Attorney, Agent, or Firm* — Ohlandt, Greeley, Ruggiero & Perle, LLP (57) ABSTRACT

A method and a device for quick photographing based on a mobile apparatus, and a mobile apparatus are provided. A long-pressed state of a preset physical button is set as a triggering condition for quick photographing, a current state of the mobile apparatus is detected and processes are respectively performed based on different states of the mobile apparatus, and then the camera is activated to enter the photographing state; therefore, the method is applicable to the mobile apparatus in any state to perform quick photographing. Moreover, after the camera is activated, a current scene is photographed if it is detected that the preset physical button is released, while the user does not need to manually click the photographing button again for photography. Only one operation is required in the whole procedure, which is simple and quick, thereby achieving the quick photographing effectively.

10 Claims, 5 Drawing Sheets

METHOD FOR QUICK PHOTOGRAPHING BASED ON MOBILE APPARATUS, DEVICE FOR QUICK PHOTOGRAPHING BASED ON MOBILE APPARATUS AND MOBILE APPARATUS

BACKGROUND

1. Field of the Disclosure

The disclosure relates to the field of smart mobile apparatus, and in particular, to a method for quick photographing based on a mobile apparatus, a device for quick photographing based on a mobile apparatus, and a mobile apparatus.

2. Discussion of the Background Art

Presently, photographing is one of the core functions of a mobile apparatus. Generally, a user utilizes the mobile apparatus to photograph with the followings steps: activating a camera application in the case where the mobile apparatus is in a normal operating state, focusing on a scene, and clicking to photograph.

In some situations such as image capturing, the user may need to photograph a current scene quickly; accordingly, the user needs to utilize the mobile apparatus to perform a quick photographing. In a conventional method for quick photographing, a certain physical button on the mobile apparatus is set as a shortcut key for photographing; the shortcut key is pressed to activate the camera application, in the case where the mobile apparatus is in a non-black-screen state; and then the user manually performs a photographing. Alternatively, in the case where the mobile apparatus is in the non-black-screen state, a certain physical button such as a volume button is set as the shortcut key for photographing; the camera application is activated after the shortcut key is long-pressed for a certain time; and then the user manually performs a photographing.

It can be seen that in the conventional technology, at least two processes of activating the camera application and pressing the photographing button are required when using the mobile apparatus to perform a quick photographing, and an extra process of focusing needs to be performed by the user. A fleeting scene or a scene required to be captured may not be captured because the photographing has too many processes and takes too much time. Therefore, in the conventional technology, the processes for quick photographing are cumbersome and the quick photographing can not be well achieved.

SUMMARY

A method for quick photographing based on a mobile apparatus and an apparatus thereof are provided in the disclosure, and with the method, quick photographing may be achieved through one operation.

To achieve the above objective, technical schemes as follows are adopted in the disclosure.

A method for quick photographing based on a mobile apparatus is provided, which includes:

detecting a current state of the mobile apparatus if it is detected that a preset physical button is pressed for a duration longer than a preset threshold;

controlling the mobile apparatus to enter a normal operating state, in the case where the mobile apparatus is in a standby state;

activating a camera and controlling the camera to enter a quick photographing mode and displaying a preview picture of a current scene, in the case where the mobile apparatus is in the normal operating state;

detecting a state of the preset physical button; and photographing the current scene in the case where the preset physical button is in a released state.

Preferably, the activating the camera and controlling the camera to enter the quick photographing mode in the case where the mobile apparatus is in the normal operating state may include:

setting a quick photographing flag of the camera as valid to control the camera to enter the quick photographing mode.

Preferably, the controlling the mobile apparatus to enter a normal operating state, in the case where the mobile apparatus is in a standby state may include:

determining whether the mobile apparatus is in a black-screen state;

controlling the mobile apparatus to enter a non-black-screen state, in the case where the mobile apparatus is in the black-screen state;

determining whether a screen lock password is set for the mobile apparatus, in the case where the mobile apparatus is in the non-black-screen state;

skipping an unlocking process and controlling the mobile apparatus to enter the normal operating state, in the case where the screen lock password is set for the mobile apparatus; or controlling the mobile apparatus to enter the normal operating state, in the case where no screen lock password is set for the mobile apparatus.

Preferably, the method may further include: recording an original state of the mobile apparatus.

The recording the original state of the mobile apparatus includes:

recording that the original state of the mobile apparatus is the black-screen state, if it is determined that the mobile apparatus is in the black-screen state; or recording that the original state of the mobile apparatus is the non-black-screen state, if it is determined that the mobile apparatus is in the non-black-screen state;

recording that the original state of the mobile apparatus is a screen-locked state, if it is determined that the screen lock password is set for the mobile apparatus; or recording that the original state of the mobile apparatus is a screen-unlocked state, if it is determined that no screen lock password is set for the mobile apparatus.

Preferably, the recording the original state of the mobile apparatus may include:

recording that the original state of the mobile apparatus is the black-screen state by setting a black-screen flag to be valid;

recording that the original state of the mobile apparatus is the non-black-screen state by setting the black-screen flag to be invalid;

recording that the original state of the mobile apparatus is the screen-locked state by setting a screen lock flag to be valid; or recording that the original state of the mobile apparatus is the screen-unlocked state by setting the screen lock flag to be invalid.

Preferably, after photographing the current scene, the method further includes:

restoring the mobile apparatus to the original state.

Preferably, the restoring the mobile apparatus to the original state may include:

determining the original state of the mobile apparatus which is recorded before the photographing;

closing the camera and controlling the mobile apparatus to enter the black-screen state, in the case where the recorded original state is the black-screen state; or closing the camera and entering a main interface of the mobile apparatus or other interfaces, in the case where the recorded original state is the non-black-screen state;

closing the camera and controlling the mobile apparatus to enter the screen-locked state, in the case where the recorded original state is the screen-locked state; or closing the camera and entering the main interface of the mobile apparatus or other interfaces, in the case where the recorded original state is the screen-unlocked state.

Preferably, the restoring the mobile apparatus to the original state may include:

determining whether the screen lock flag is valid;

closing the camera and controlling the mobile apparatus to enter the screen-locked state, in the case where the screen lock flag is valid; or closing the camera and entering a main interface of the mobile apparatus or other interfaces, in the case where the screen lock flag is invalid; and determining whether the black-screen flag is valid;

closing the camera and controlling the mobile apparatus to enter the black-screen state, in the case where the black-screen flag is valid; or closing the camera and controlling the mobile apparatus to enter the main interface or other interfaces, in the case where the black-screen flag is invalid.

A device for quick photographing based on a mobile apparatus is provided, which includes:

a first detection unit, configured to detect a current state of the mobile apparatus if it is detected that a preset physical button is pressed for a duration longer than a preset threshold;

a first control unit, configured to control the mobile apparatus to enter a normal operating state in the case where the mobile apparatus is in a standby state;

a second control unit, configured to activate a camera and to control the camera to enter a quick photographing mode and display a preview picture of a current scene, in the case where the mobile apparatus is in the normal operating state;

a second detection unit, configured to detect a state of the preset physical button; and a photographing unit, configured to photograph the current scene in the case where the preset physical button is in a released state.

A mobile apparatus is provided, which includes a device for quick photographing based on the mobile apparatus.

In the method for quick photographing based on the mobile apparatus provided in the disclosure, the long-pressed state of the preset physical button is set as a triggering condition for the quick photographing, the current state of the mobile apparatus is detected and processes are respectively performed based on different states of the mobile apparatus, and then the camera is activated to enter the photographing state; therefore, the method is applicable to the mobile apparatus in any state to perform quick photographing. Moreover, after the camera is activated, the current scene is photographed if it is detected that the preset physical button is released, while the user does not need to manually click the photographing button again for photography. Therefore, the user merely needs to long-press the preset physical button and release the preset physical button when necessary, to implement the quick photographing. Only one operation is required in the whole procedure, which is simple and quick, thereby achieving the quick photographing effectively.

BRIEF DESCRIPTION OF DRAWINGS

To illustrate technical schemes according to the embodiments of the disclosure or in the conventional technology more clearly, the drawings to be used in the description of the conventional technology or the embodiments are described briefly hereinafter. Apparently, the drawings described hereinafter are only some embodiments of the present disclosure, and other drawings may be obtained by those skilled in the art based on those drawings without creative effort.

DETAILED DESCRIPTION OF THE PREFERRED EMBODIMENTS

Hereinafter, technical schemes in embodiments of the present disclosure are described clearly and completely in conjunction with drawings in the embodiments of the present disclosure. Apparently, the described embodiments are only a part of rather than all of the embodiments of the present disclosure. Any other embodiments obtained by those skilled in the art based on the embodiments of the present disclosure without creative effort shall fall within the scope of protection of the disclosure.

Figure 1:
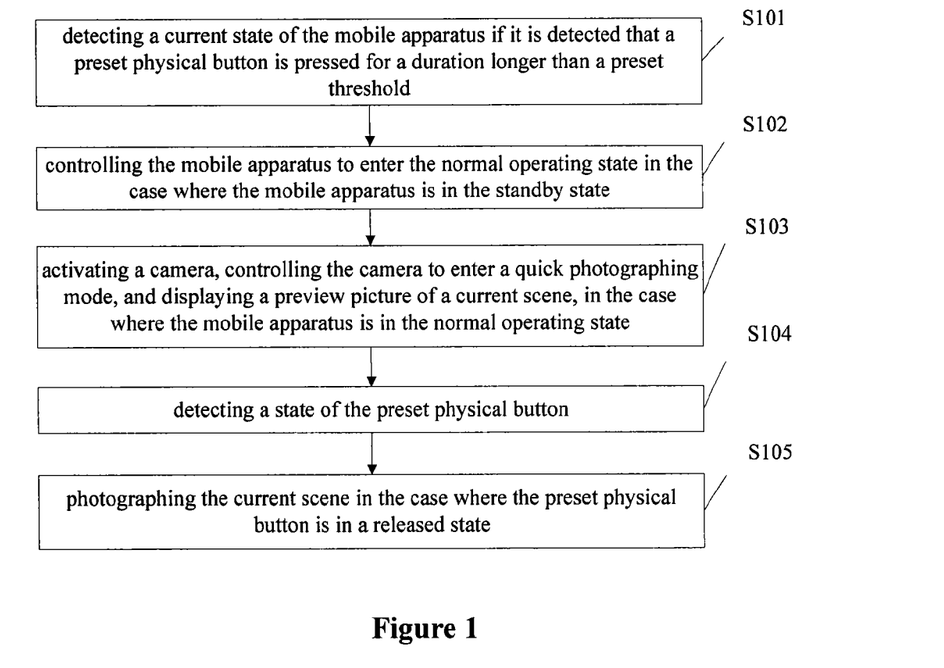
FIG. 1 is a flowchart of a method for quick photographing based on a mobile apparatus according to an embodiment of the disclosure.

A method for quick photographing based on a mobile apparatus is provided according to an embodiment of the disclosure. As shown in FIG. 1, the embodiment includes steps S101 to S105.

Step S101 is to detect a current state of the mobile apparatus if it is detected that a preset physical button is pressed for a duration longer than a preset threshold.

No matter what state the mobile apparatus is in, a system program in the mobile apparatus continually detects a state of the preset physical button. The preset physical button is any mechanical physical button pre-provided on the mobile apparatus, and the state of the preset physical button is detected continually by the system program in any state. In the case where the preset physical button is in a long-pressed state, a quick photographing program is triggered. Therefore, the state of the preset physical button is used as a condition for determining whether a quick photographing is to be triggered.

The long-pressed state is a state that the preset physical button is pressed for a duration longer than the preset threshold. In the case where the system program detects that the preset physical button is switched from a released state to a pressed state, a duration in which the preset physical button maintains in the pressed state is timed. In the case where the duration in which the preset physical button maintains pressed is longer than the preset threshold, it is considered that the preset physical button is long-pressed by the user and it is determined that the preset physical button is in the long-pressed state, and a quick photographing procedure is triggered. The preset threshold is a time threshold preset by an engineer for determining whether the preset physical button is in the long-pressed state. The length of the preset threshold may be set by the engineer, such as 2 s, 2.5 s, which is not limited herein.

After it is determined that the preset physical button is in the long-pressed state, the system program detects a current state of the mobile apparatus. The current state of the mobile apparatus may include a normal operating state and a standby state. The standby state may include three kinds: a black-screen and non-screen-lock-password state, a black-screen and screen-lock-password state and a non-black-screen and screen-lock-password state.

A black-screen state is a state in which the mobile apparatus turns off screen brightness to save power of the mobile apparatus. A screen-locked state is a state in which a password is set by the user for the mobile apparatus to ensure security of the user and the mobile apparatus enters the normal operating state after the mobile apparatus is unlocked with the inputting of the password. The normal operating state is a state that the mobile apparatus is in a non-black-screen and screen-unlocked state and any function of the mobile apparatus can be used normally.

Step S102 is to control the mobile apparatus to enter the normal operating state in the case where the mobile apparatus is in the standby state.

In the case where the system program detects that the mobile apparatus is in the standby state, the mobile apparatus is controlled to enter the normal operating state. That is to say, no matter what kind of standby state the mobile apparatus is in, the mobile apparatus is set by the system program to enter the normal operating state, i.e., the non-black-screen and screen-unlocked state. A camera function may be used by the user normally only in the case where the mobile apparatus is in the normal operating state.

Step S103 is to activate a camera, control the camera to enter a quick photographing mode, and display a preview picture of a current scene, in the case where the mobile apparatus is in the normal operating state.

Controlling the camera to enter the quick photographing mode specifically includes setting a quick photographing flag of the camera as valid to control the camera to enter the quick photographing mode.

In the case where the system program detects that the mobile apparatus is in the normal operating state, the quick photographing flag of the camera is set to be valid, and information that the quick photographing flag is valid is transmitted to a camera program in the system program, and the camera program in the system program enables the camera to enter the quick photographing mode upon reception of the information that the quick photographing flag of the camera is valid.

After the camera is activated and enters the quick photographing mode, the current scene is captured by the camera via a lens of the mobile apparatus and a preview scene is displayed on a screen of the mobile apparatus. The user may move the mobile apparatus based on needs, so that the preview scene is a required scene of the user.

Step S104 is to detect a state of the preset physical button.

In the quick photographing mode, the photographing mode of the camera is different from a normal photographing mode. The system program may not detect a state of a photographing button of the camera, but detects the state of the preset physical button. In the case where it is detected that the preset physical button is released, the current scene is photographed.

Step S105 is to photograph the current scene in the case where the preset physical button is in a released state.

When the user considers that the preview scene displayed currently on the mobile apparatus is the required scene, the user may release the preset physical button. After the quick photographing mode is entered, the system program may detect the state of the preset physical button continually. In the case where the system program detects that the preset physical button is switched from the long-pressed state to a released state, the photographing is initiated, the current scene is photographed and stored into an album.

In the method for quick photographing based on the mobile apparatus provided in the disclosure, the long-pressed state of the preset physical button is set as a triggering condition for the quick photographing, the current state of the mobile apparatus is detected and processes are respectively performed based on different states of the mobile apparatus, and then the camera is activated to enter the photographing state; therefore, the method is applicable to the mobile apparatus in any state to perform quick photographing. Moreover, after the camera is activated, the current scene is photographed if it is detected that the preset physical button is released, while the user does not need to manually click the photographing button again for photography. Therefore, the user merely needs to long-press the preset physical button and release the preset physical button when necessary, to implement the quick photographing. Only one operation is required in the whole procedure, which is simple and quick, thereby achieving the quick photographing effectively.

Figure 2:
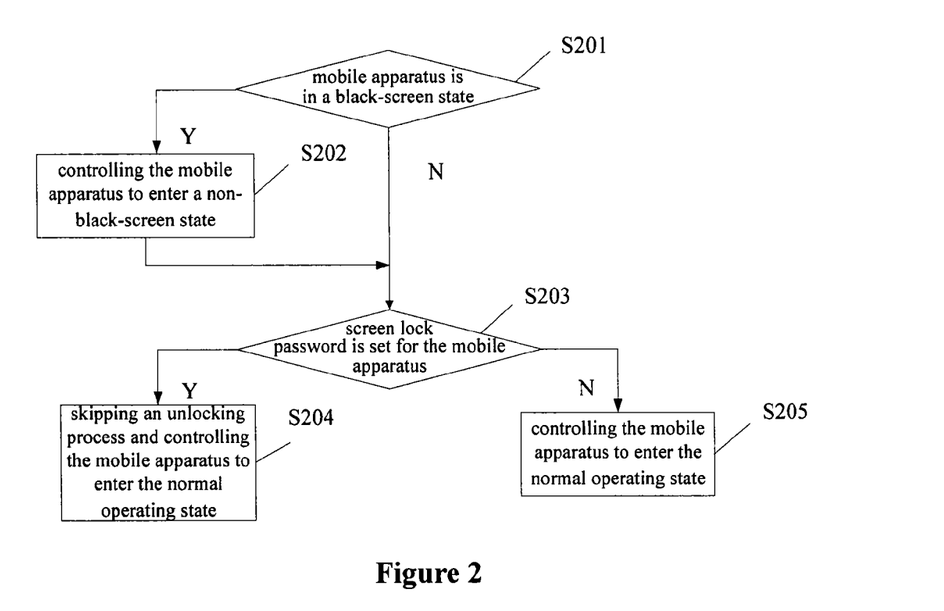
FIG. 2 is a flowchart of a process of switching from a standby state to a normal operating state by a mobile apparatus in a method for quick photographing based on the mobile apparatus according to an embodiment of the disclosure.

A method for quick photographing based on a mobile apparatus is provided according to another embodiment of the disclosure. The processes in the embodiment are substantially same as those in the embodiment as shown in FIG. 1. The step S102 in the embodiment as shown in FIG. 1 may be preferably implemented by the following steps S201 to S205 as shown in FIG. 2.

In step S201, it is determined whether the mobile apparatus is in a black-screen state; step S202 is performed in the case where the mobile apparatus is in the black-screen state; or step S203 is performed in the case where the mobile apparatus is in a non-black-screen state.

In step S202, the mobile apparatus is controlled to enter the non-black-screen state in the case where the mobile apparatus is in the black-screen state.

In the case where the mobile apparatus is in the black-screen state, the screen of the mobile apparatus is lighted up to control the mobile apparatus to be in the non-black-screen state.

In step S203, it is determined whether a screen lock password is set for the mobile apparatus, in the case where the mobile apparatus is in the non-black-screen state; step S204 is performed in the case where a screen lock password is set; or step S205 is performed in the case where no screen lock password is set.

In step S204, an unlocking process is skipped and the mobile apparatus is controlled to enter the normal operating state, in the case where the screen lock password is set for the mobile apparatus.

In the case where the screen lock password is set for the mobile apparatus, the camera is activated until the unlocking is performed by the user in ordinary circumstances in view of security. To implement a quick photographing, in the method, the unlocking process is skipped and the normal operating state is entered directly.

In step S205, the mobile apparatus is controlled to enter the normal operating state, in the case where no screen lock password is set for the mobile apparatus.

No matter what kind of standby state the mobile apparatus is in, the mobile apparatus is controlled to enter the normal operating state, i.e., the non-black-screen and screen-unlocked state.

The above embodiment may further include a process of recording an original state of the mobile apparatus. Since the original state of the mobile apparatus may include, for example, the black-screen state, the non-black-screen state, a screen-locked state and a screen-unlocked state, the process may be practically performed after each operation with which the original state is determined. For example, it may be recorded that the original state of the mobile apparatus is the black-screen state, in the case where it is determined that the mobile apparatus is in the black-screen state in the step S202 of the embodiment.

Figure 3:
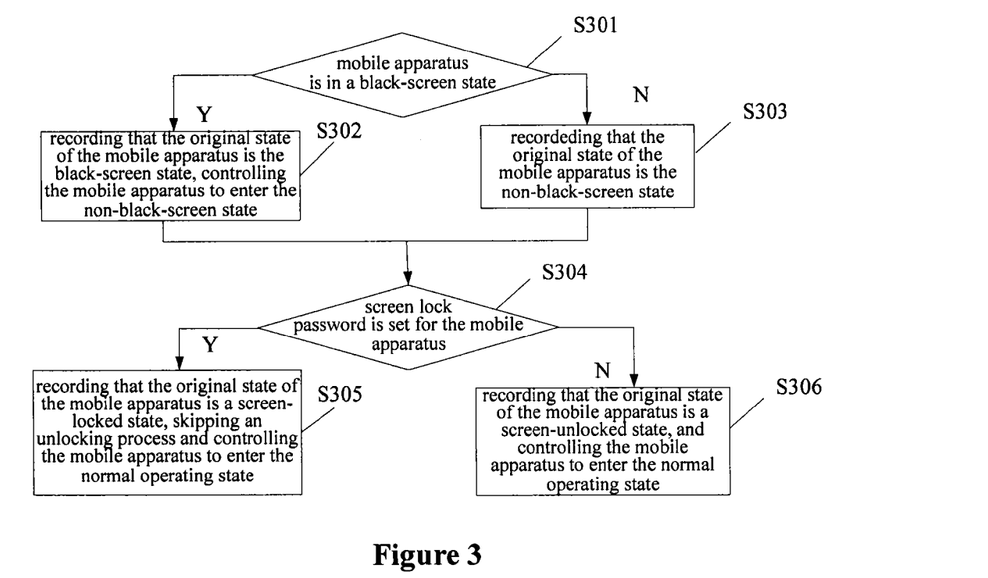
FIG. 3 is a flowchart of a process of switching from a standby state to a normal operating state by a mobile apparatus in another method for quick photographing based on the mobile apparatus according to an embodiment of the disclosure.

Based on the above embodiment and in conjunction with the process of recording the original state of the mobile apparatus, a specific implementation of the step S102 may include steps S301 to S306 as shown in FIG. 3.

In step S301, it is determined whether the mobile apparatus is in the black-screen state; step S302 is performed in the case where the mobile apparatus is in the black-screen state; or S303 is performed in the case where the mobile apparatus is in the non-black-screen state.

In step S302, it is recorded that the original state of the mobile apparatus is the black-screen state, the mobile apparatus is controlled to enter the non-black-screen state, and step S304 is performed.

It is recorded that the original state of the mobile apparatus is the black-screen state, in the case where it is determined that the mobile apparatus is in the black-screen state. Specifically, it is recorded that the original state of the mobile apparatus is the black-screen state by setting a black-screen flag as valid.

In step S303, it is recorded that the original state of the mobile apparatus is the non-black-screen state, and step S304 is performed.

It is recorded that the original state of the mobile apparatus is the non-black-screen state, in the case where it is determined that the mobile apparatus is in the non-black-screen state. Specifically, it is recorded that the original state of the mobile apparatus is the non-black-screen state by setting the black-screen flag as invalid.

In step S304, it is determined whether a screen lock password is set for the mobile apparatus.

In step S305, it is recorded that the original state of the mobile apparatus is the screen-locked state, the unlocking process is skipped, and the mobile apparatus is controlled to enter the normal operating state.

It is recorded that the original state of the mobile apparatus is the screen-locked state, if it is determined that the screen lock password is set for the mobile apparatus. Specifically, it is recorded that the original state of the mobile apparatus is the screen-locked state by setting a screen lock flag as valid.

In step S306, it is recorded that the original state of the mobile apparatus is the screen-unlocked state, and the mobile apparatus is controlled to enter the normal operating state.

It is recorded that the original state of the mobile apparatus is the screen-unlocked state, if it is determined that no screen lock password is set for the mobile apparatus. Specifically, it is recorded that the original state of the mobile apparatus is the screen-unlocked state by setting the screen lock flag as invalid.

In the embodiment, the original state of the mobile apparatus is recorded before the mobile apparatus performs a quick photographing operation, and the mobile apparatus may be controlled to restore to its original state after the quick photographing operation is completed.

Figure 4:
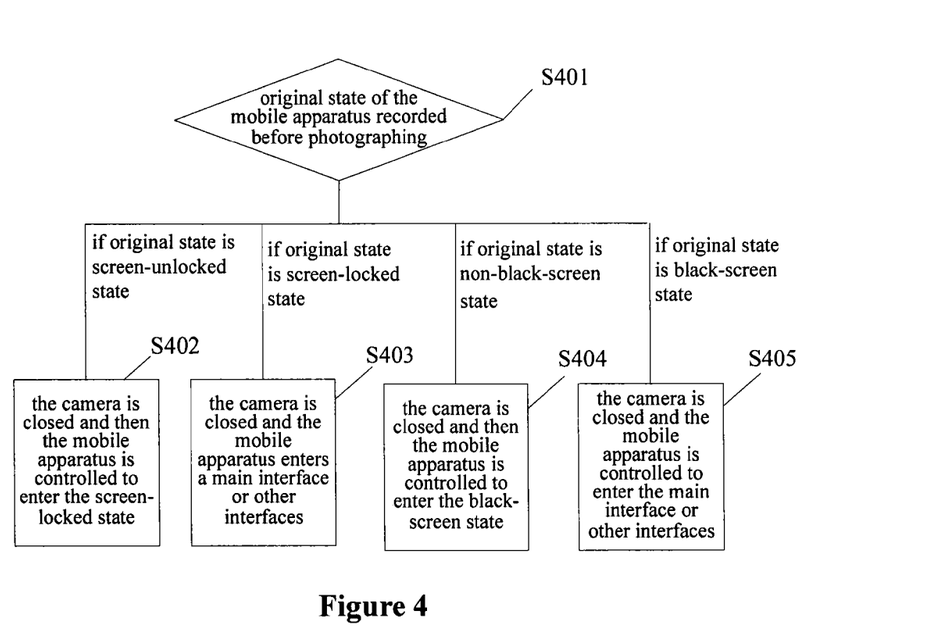
FIG. 4 is a flowchart of restoring a mobile apparatus to an original state in a method for quick photographing based on the mobile apparatus according to an embodiment of the disclosure.

In conjunction with the embodiment as shown in FIG. 3, in another method for quick photographing based on a mobile apparatus provided in the disclosure, after the current scene is photographed, the method further includes a process of controlling the mobile apparatus to restore to the original state of the mobile apparatus. As shown in FIG. 4, the process includes steps S401 to S405.

Step S401 is to determine the original state of the mobile apparatus which is recorded before the photographing.

In step S402, the camera is closed and then the mobile apparatus is controlled to enter the screen-locked state, in the case where the original state of the mobile apparatus is the screen-locked state.

In step S403, the camera is closed and the mobile apparatus enters a main interface or other interfaces, in the case where the original state of the mobile apparatus is the screen-unlocked state.

In step S404, the camera is closed and then the mobile apparatus is controlled to enter the black-screen state, in the case where the original state of the mobile apparatus is the black-screen state.

In step S405, the camera is closed and the mobile apparatus enters the main interface or other interfaces, in the case where the original state of the mobile apparatus is the non-black-screen state.

For ensuring security of the mobile apparatus, the camera program is closed after the quick photographing operation is completed. The state of the mobile apparatus, which is recorded before the photographing, is determined by the system program. If the state of the mobile apparatus recorded before the photographing is the screen-locked state, it indicates that a screen lock password is set by the user, and the mobile apparatus is controlled by the system program to enter the screen-locked state for ensuring security of the mobile apparatus. If the state of the mobile apparatus recorded before the photographing is the screen-unlocked state, the main interface or other interface is entered directly, or the photographed scene is displayed. If the state of the mobile apparatus recorded before the photographing is the black-screen state, the mobile apparatus is controlled to enter the black-screen state after the camera is closed. If the state of the mobile apparatus recorded before the photographing is the non-black-screen state, the main interface or other interface is entered directly.

Figure 5:
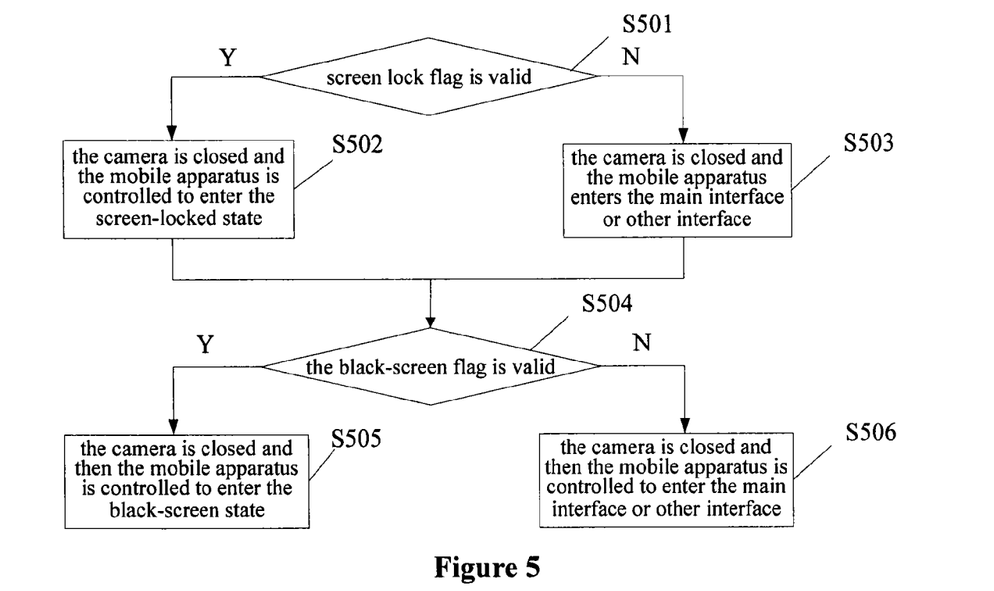
FIG. 5 is a flowchart of restoring a mobile apparatus to an original state in another method for quick photographing based on the mobile apparatus according to an embodiment of the disclosure.

In conjunction with the embodiment as shown in FIG. 3, in another method for quick photographing based on a mobile apparatus provided in the disclosure, after the current scene is photographed, the method further includes a process of controlling the mobile apparatus to restore to the original state of the mobile apparatus. As shown in FIG. 5, the process includes steps S501 to S506.

In step S501, it is determined whether the screen lock flag is valid.

The original state of the mobile apparatus includes the black-screen state, the non-black-screen state, the screen-locked state and the screen-unlocked state. In practical implementation, it is determined whether the mobile apparatus is in the screen-locked state or the screen-unlocked state by determining whether the screen lock flag is valid or not, and it is determined whether the mobile apparatus is in the black-screen state or the non-black-screen state by determining whether the black-screen flag is valid or not.

In an embodiment of the disclosure, it may be uniformly adopted that a flag set to '1' indicates that the flag is valid and a flag set to '0' indicates that the flag is invalid.

In step S502, the camera is closed and the mobile apparatus is controlled to enter the screen-locked state, in the case where the screen lock flag is valid.

In practical implementation, in the case where the screen lock flag is valid, that is, the screen lock flag is set to '1', the camera is closed and then the mobile apparatus is controlled to enter the screen-locked state.

In step S503, the camera is closed and the mobile apparatus enters the main interface or other interface, in the case where the screen lock flag is invalid.

In practical implementation, in the case where the screen lock flag is invalid, that is, the screen lock flag is set to '0', the camera is closed and then the mobile apparatus enters the main interface or other interface.

In step S504, it is determined whether the black-screen flag is valid.

In step S505, the camera is closed and then the mobile apparatus is controlled to enter the black-screen state, in the case where the black-screen flag is valid.

In practical implementation, in the case where the black-screen flag is valid, that is, the black-screen flag is set to '1', the camera is closed and then the mobile apparatus is controlled to enter the black-screen state.

In step S506, the camera is closed and then the mobile apparatus is controlled to enter the main interface or other interface, in the case where the black-screen flag is invalid.

In practical implementation, in the case where the black-screen flag is invalid, that is, the black-screen flag is set to '0', the camera is closed and then the mobile apparatus enters the main interface or other interface.

The original state of the mobile apparatus is recorded by using the flags in the embodiment, which is simple and practical. After the photographing is completed, the original state of the mobile apparatus is obtained by determined whether the flags are valid or not, and the mobile apparatus is restored to the original state. The flag is a character of one byte, which takes up less memory and is convenient to use. Therefore, the mobile apparatus may be restored to the original state simply and conveniently with the method.

Figure 6:
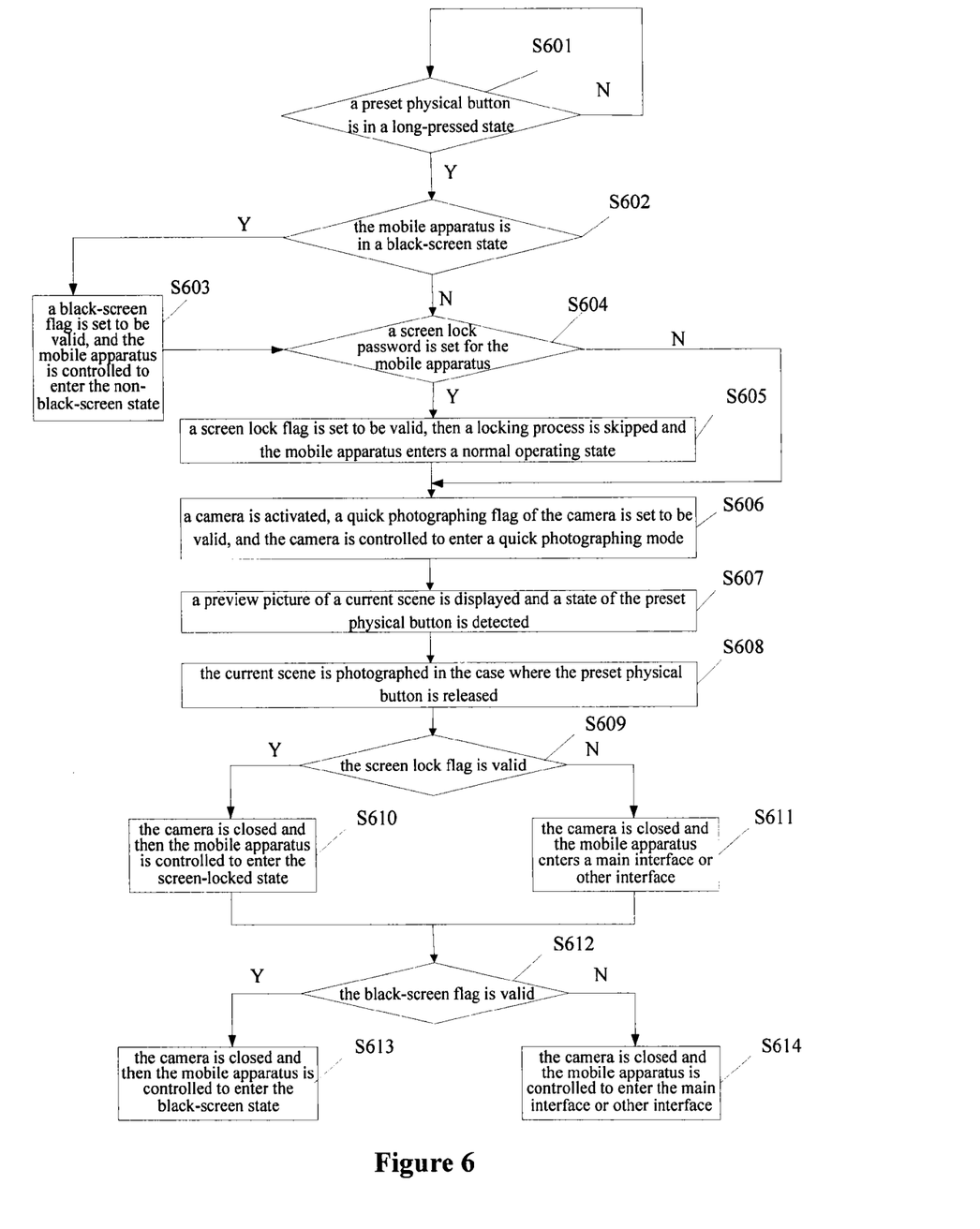
FIG. 6 is a flowchart of another method for quick photographing based on a mobile apparatus according to an embodiment of the disclosure.

As shown in FIG. 6, a method for quick photographing based on a mobile apparatus is provided according to an embodiment of the disclosure, which includes steps S601 to S614.

In step S601, it is detected whether a preset physical button is in a long-pressed state; step S602 is performed in the case where the preset physical button is in the long-pressed state; or step S601 is further performed to continually detect a state of the preset physical button in the case where the preset physical button is not in the long-pressed state.

In step S602, it is determined whether the mobile apparatus is in a black-screen state, in the case where the preset physical button is in the long-pressed state; step S603 is performed in the case where the mobile apparatus is in the black-screen state; or step S604 is performed in the case where the mobile apparatus is in a non-black-screen state.

In step S603, a black-screen flag is set to be valid, and the mobile apparatus is controlled to enter the non-black-screen state.

In step S604, it is determined whether a screen lock password is set for the mobile apparatus; step S605 is performed in the case where the screen lock password is set for the mobile apparatus; or step S606 is performed in the case where no screen lock password is set for the mobile apparatus.

In step S605, a screen lock flag is set to be valid, then a locking process is skipped and the mobile apparatus enters a normal operating state.

A current standby state of the mobile apparatus may be determined based on the two flags set in the above steps. The current standby state of the mobile apparatus is a black-screen and screen-unlocked state in the case where the black-screen flag is valid and the screen lock flag is invalid; the current standby state of the mobile apparatus is a black-screen and screen-locked state in the case where the black-screen flag is valid and the screen lock flag is valid; or the current standby state of the mobile apparatus is a non-black-screen and screen-locked state in the case where the black-screen flag is invalid and the screen lock flag is valid. No matter what kind of standby state the mobile apparatus is in, the mobile apparatus is controlled by a system program to enter the normal operating state, i.e., a non-black-screen and screen-unlocked state.

In step S606, a camera is activated, a quick photographing flag of the camera is set to be valid, and the camera is controlled to enter a quick photographing mode.

In step S607, a preview picture of a current scene is displayed and a state of the preset physical button is detected; the current scene maintains displayed in the case where the preset physical button is not released; or step S608 is performed in the case where the preset physical button is released.

In step S608, the current scene is photographed in the case where the preset physical button is released.

In step S609, it is determined whether the screen lock flag is valid.

In step S610, the camera is closed and then the mobile apparatus is controlled to enter the screen-locked state, in the case where the screen lock flag is valid.

In step S611, the camera is closed and the mobile apparatus enters a main interface or other interface, in the case where the screen lock flag is invalid.

In step S612, it is determined whether the black-screen flag is valid.

In step S613, the camera is closed and then the mobile apparatus is controlled to enter the black-screen state, in the case where the black-screen flag is valid.

In step S614, the camera is closed and the mobile apparatus is controlled to enter the main interface or other interface, in the case where the black-screen flag is invalid.

Figure 7:
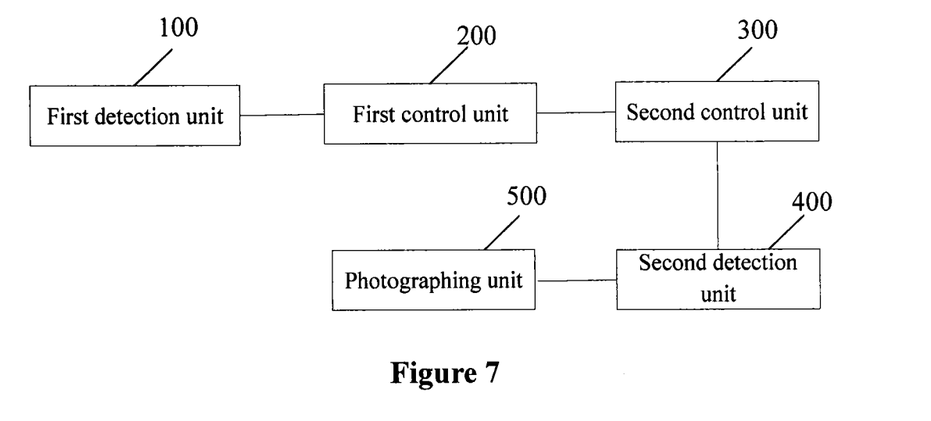
FIG. 7 is a schematic structural diagram of a device for quick photographing based on a mobile apparatus according to an embodiment of the disclosure.

As shown in FIG. 7, a device for quick photographing based on a mobile apparatus is further provided in the disclosure, which includes a first detection unit 100, configured to detect a current state of the mobile apparatus if it is detected that a preset physical button is pressed for a duration longer than a preset threshold;

a first control unit 200, configured to control the mobile apparatus to enter a normal operating state in the case where the mobile apparatus is in a standby state;

a second control unit 300, configured to, activate a camera, control the camera to enter a quick photographing mode, and display a preview picture of a current scene, in the case where the mobile apparatus is in the normal operating state;

a second detection unit 400, configured to detect a state of the preset physical button; and a photographing unit, configured to photograph the current scene in the case where the preset physical button is in a released state.

In the device for quick photographing based on the mobile apparatus provided in the disclosure, the long-pressed state of the preset physical button is set as a triggering condition for the quick photographing, the current state of the mobile apparatus is detected and processes are respectively performed based on different states of the mobile apparatus, and then the camera is activated to enter the photographing state; therefore, the method is applicable to the mobile apparatus in any state to perform quick photographing. Moreover, after the camera is activated, the current scene is photographed if it is detected that the preset physical button is released, while the user does not need to manually click the photographing button again for photography. Therefore, the user merely needs to long-press the preset physical button and release the preset physical button when necessary, to implement the quick photographing. Only one operation is required in the whole procedure, which is simple and quick, thereby achieving the quick photographing effectively.

A mobile apparatus includes the device for quick photographing as shown in FIG. 7. The mobile apparatus includes all units in the device shown in FIG. 7, and the functions and the cooperative operation processes of the units may be understood with reference to the embodiment shown in FIG. 7 and are not repeated herein.

If the functions of the methods according to the embodiments are realized in a form of software function modules, and are made into a separate product for sale and usage, the software function modules may be stored in a computer readable storage medium. Based on such understanding, a part of the technical scheme or a part of the embodiments of the disclosure contributing to the conventional technologies may be realized in a form of software product. The computer software product is stored in a storage medium and includes several instructions which are used to instruct a computer device (which may be a personal computer, a server, a mobile computing device or a network device, etc.) to perform a part of or all of the steps of the methods described in the embodiments of the present disclosure. And the aforementioned storage medium includes various media which may store program code, such as a U disk, a mobile hard disk, a Read-Only Memory (ROM), a Random Access Memory (RAM), a magnetic disk or an optical disk.

The embodiments of the present disclosure are described herein in a progressive manner, each embodiment emphasizes on explaining the differences from other embodiments, and for the same or similar parts among the embodiments, one embodiment can be understood with reference to the other embodiments.

The above description of the embodiments disclosed herein enables those skilled in the art to implement or use the present disclosure. Numerous modifications to the embodiments may be apparent to those skilled in the art, and the general principle herein can be implemented in other embodiments without deviation from the spirit or scope of the present disclosure. Therefore, the present disclosure is not limited to the embodiments described herein, but shall be in accordance with the widest scope consistent with the principle and novel features disclosed herein.

What is claimed is:

1. A method for quick photographing based on a mobile apparatus, comprising:
    detecting whether a current state of the mobile apparatus is a normal operating state or a standby state when a preset physical button is pressed for a duration longer than a preset threshold, wherein the standby state comprises a black-screen and non-screen-lock-password state, a black screen and screen-lock-password state or a non-black-screen and screen-lock-password state;
    controlling the mobile apparatus to enter the normal operating state if the mobile apparatus is in the standby state;
    activating a camera;
    controlling the camera to enter a quick photographing mode;
    displaying a preview picture of a current scene if the mobile apparatus is in the normal operating state;
    detecting a state of the preset physical button; and
    photographing the current scene if the preset physical button is in a released state.

2. The method according to claim 1, wherein activating the camera and controlling the camera to enter the quick photographing mode if the mobile apparatus is in the normal operating state comprises:
    setting a quick photographing flag of the camera as valid to control the camera to enter the quick photographing mode.

3. The method according to claim 1, wherein controlling the mobile apparatus to enter a normal operating state if the mobile apparatus is in a standby state comprises:
    determining whether the mobile apparatus is in a black-screen state;
    controlling the mobile apparatus to enter a non-black-screen state if the mobile apparatus is in the black-screen state;
    determining whether a screen lock password is set for the mobile apparatus if the mobile apparatus is in the non-black-screen state;
    skipping an unlocking process and (a) controlling the mobile apparatus to enter the normal operating state if the screen lock password is set for the mobile apparatus or (b) controlling the mobile apparatus to enter the normal operating state if no screen lock password is set for the mobile apparatus.

4. The method according to claim 3, further comprising:
    recording an original state of the mobile apparatus, wherein the recording the original state of the mobile apparatus comprises:
        recording that the original state of the mobile apparatus is the black-screen state if the mobile apparatus is in the black-screen state;
        recording that the original state of the mobile apparatus is the non-black-screen state if the mobile apparatus is in the non-black-screen state;
        recording that the original state of the mobile apparatus is a screen-locked state if the screen lock password is set for the mobile apparatus; or
        recording that the original state of the mobile apparatus is a screen-unlocked state if no screen lock password is set for the mobile apparatus.

5. The method according to claim 4, wherein the recording an original state of the mobile apparatus comprises:
recording that the original state of the mobile apparatus is the black-screen state by setting a black-screen flag as valid;
recording that the original state of the mobile apparatus is the non-black-screen state by setting the black-screen flag as invalid;
recording that the original state of the mobile apparatus is the screen-locked state by setting a screen lock flag as valid; or
recording that the original state of the mobile apparatus is the screen-unlocked state by setting the screen lock flag as invalid.

6. The method according to claim 4, wherein after photographing the current scene, the method further comprises:
restoring the mobile apparatus to the original state.

7. The method according to claim 6, wherein restoring the mobile apparatus to the original state comprises:
determining the original state of the mobile apparatus that was recorded before the photographing;
closing the camera and controlling the mobile apparatus to enter the black-screen state if the recorded original state is the black-screen state;
closing the camera and entering a main interface of the mobile apparatus or other interfaces if the recorded original state is the non-black-screen state;
closing the camera and controlling the mobile apparatus to enter the screen-locked state if the recorded original state is the screen-locked state; or
closing the camera and entering the main interface of the mobile apparatus or other interfaces if the recorded original state is the screen-unlocked state.

8. The method according to claim 6, wherein restoring the mobile apparatus to the original state comprises:
determining whether the screen lock flag is valid;
closing the camera and controlling the mobile apparatus to enter the screen-locked state if the screen lock flag is valid, or closing the camera and entering a main interface of the mobile apparatus or other interfaces if the screen lock flag is invalid; and
determining whether the black-screen flag is valid;
closing the camera and controlling the mobile apparatus to enter the black-screen state if the black-screen flag is valid, or closing the camera and controlling the mobile apparatus to enter the main interface or other interfaces if the black-screen flag is invalid.

9. A device for quick photographing based on a mobile apparatus, comprising:
a first detection unit configured to detect whether a current state of the mobile apparatus is a normal operating state or a standby state when a preset physical button is pressed for a duration longer than a preset threshold, wherein the standby state comprises a black-screen and non-screen-lock-password state, a black-screen and screen-lock-password state or a non-black-screen and screen-lock-password state;
a first control unit configured to control the mobile apparatus to enter the normal operating state if the mobile apparatus is in the standby state;
a second control unit configured to activate a camera and to control the camera to enter a quick photographing mode and display a preview picture of a current scene if the mobile apparatus is in the normal operating state;
a second detection unit configured to detect a state of the preset physical button; and
a photographing unit configured to photograph the current scene if the preset physical button is in a released state.

10. A mobile apparatus, comprising a device for quick photographing;
wherein the device for quick photographing comprises:
a first detection unit configured to detect whether a current state of the mobile apparatus is a normal operating state or a standby state when a preset physical button is pressed for a duration longer than a preset threshold, wherein the standby state comprises a black-screen and non-screen-lock password state, a black-screen and screen-lock-password state or a non-black-screen-lock-password state;
a first control unit configured to control the mobile apparatus to enter the normal operating state if the mobile apparatus is in the standby state;
a second control unit configured to activate a camera and to control the camera to enter a quick photographing mode and display a preview picture of a current scene if the mobile apparatus is in the normal operating state;
a second detection unit configured to detect a state of the preset physical button; and
a photographing unit configured to photograph the current scene if the preset physical button is in a released state.

* * * * *